(12) United States Patent
Chen (10) Patent No.: US 12,555,827 B2
(45) Date of Patent: Feb. 17, 2026

(54) AUTOMATIC SOLID-STATE BATTERY PRODUCTION EQUIPMENT

(71) Applicant: Ga-Lane Chen, Fremont, CA (US)

(72) Inventor: Ga-Lane Chen, Fremont, CA (US)

( * ) Notice: Subject to any disclaimer, the term of this patent is extended or adjusted under 35 U.S.C. 154(b) by 453 days.

(21) Appl. No.: 18/154,530

(22) Filed: Jan. 13, 2023

(65) Prior Publication Data

US 2023/0335800 A1    Oct. 19, 2023

(30) Foreign Application Priority Data

Apr. 13, 2022    (TW) .................................. 111114094

(51) Int. Cl.
| | |
|---|---|
| *H01M 10/04* | (2006.01) |
| *H01M 4/139* | (2010.01) |
| *H01M 10/0562* | (2010.01) |
| *H01M 10/058* | (2010.01) |
| *H01M 10/052* | (2010.01) |

(52) U.S. Cl.
CPC ......... *H01M 10/058* (2013.01); *H01M 4/139* (2013.01); *H01M 10/0404* (2013.01); *H01M 10/0562* (2013.01); *H01M 10/052* (2013.01)

(58) Field of Classification Search
CPC ......... H01M 10/0404; H01M 10/0562; H01M 10/058; H01M 4/139
See application file for complete search history.

(56) References Cited

U.S. PATENT DOCUMENTS

| | | | |
|---|---|---|---|
| 2016/0099468 A1* | 4/2016 | Anapolsky | ........ H01M 10/0562 |
| | | | 429/231.95 |
| 2019/0088924 A1* | 3/2019 | Wang | .................... C23C 14/042 |

FOREIGN PATENT DOCUMENTS

| | | | | |
|---|---|---|---|---|
| CN | 108365267 A | * | 8/2018 | .......... H01M 10/058 |
| WO | WO-2016033453 A1 | * | 3/2016 | ........ H01M 10/0404 |

\* cited by examiner

*Primary Examiner* — Kevin E Yoon (57) ABSTRACT

The present invention provides an automatic solid-state battery production equipment, comprising a cathode deposition device, an anode deposition device, a solid-state electrolyte forming device, a stacking pressing device, and one or more transport device for moving the parts manufactured by the cathode deposition device, the anode deposition device, and the solid-state electrolyte forming device to the stacking pressing device to crimp into the automatic solid-state battery products for automatic processing procedures.

7 Claims, 6 Drawing Sheets

AUTOMATIC SOLID-STATE BATTERY PRODUCTION EQUIPMENT

FIELD OF TECHNOLOGY

The present invention relates to a solid-state battery production equipment, in particular to an automatic solid-state battery production equipment.

BACKGROUND

In the process of discharging and charging of traditional liquid-state lithium batteries with electrolyte, lithium ions may be non-uniformly distributed on a cathode, resulting in gradually forming dendrite-like crystals on the cathode. The more the dendrite-like crystals are formed, the more the dendrite-like crystals grow, which penetrates a separator to an anode of the battery and thus short-circuiting the battery. In addition, in the process of continuous charging and discharging, the liquid-state lithium battery is easy to deteriorate the battery capacity thereof due to continuous charging and discharging, which affects the service life of the battery. Furthermore, the liquid-state lithium-ion battery has flammable electrolyte solution, resulting in many safety problems, such as electrolyte leakage, fire or explosion, so solid-state lithium batteries are developed.

SUMMARY

In the existing production technologies of solid-state lithium batteries, the batteries are all produced manually in drying rooms or glove boxes. However, the production of solid-state batteries manually is time-consuming and laborious, and it is also difficult to produce batteries in large quantities. Therefore, the inventor proposed an innovative automatic solid-state battery production equipment to automate the production of solid-state lithium batteries.

The present invention provides a solid-state battery production equipment, comprising: a cathode deposition device, wherein the cathode deposition device comprises a cathode deposition chamber and a cathode processing device configured in the cathode deposition chamber, a first gas input equipment, a first ultra-high vacuum pressure equipment, a plurality of first heaters and a plurality of first transducers; an anode deposition device, wherein the anode deposition device comprises an anode deposition chamber and an anode processing device configured in the anode deposition chamber, a second gas input equipment, a second ultra-high vacuum pressure equipment, a plurality of second heaters and a plurality of second transducers;
  a solid-state electrolyte forming device, wherein the solid-state electrolyte forming device comprises a solid-state electrolyte forming chamber, a solid-state electrolyte forming processing device configured in the solid-state electrolyte forming chamber, a third gas input equipment, a third ultra-high vacuum pressure equipment, a plurality of third transducers and a carrier device;
  a stacking pressing device, wherein the stacking pressing device comprises a stacking pressing chamber and a stacking pressing processing device configured in the stacking pressing chamber, a fourth gas input equipment, a fourth ultra-high vacuum pressure equipment, and a plurality of fourth transducers; and
  one or more transport devices, used for moving parts manufactured by the cathode deposition device, the anode deposition device and the solid-state electrolyte forming device to the stacking pressing device to crimp into a finished solid-state battery through the stacking pressing device so as to realize an automatic processing procedure.

In one or more embodiments, the automatic solid-state battery production equipment further comprises an isolation device comprising an isolation chamber and a plurality of transducers configured in the isolation chamber.

In one or more embodiments, the transducers comprise a temperature controller, a humidity controller, a gas flow rate controller, a vacuum gauge and a pressure gauge.

In one or more embodiments, the first ultra-high vacuum pressure equipment comprises a turbomolecular pump, a mechanical pump, a first channel configured between the high vacuum valve and the cathode deposition chamber, a second channel configured between the mechanical pump and the cathode deposition chamber, a third channel configured between the first channel and the second channel, a part of the first channel close to the cathode deposition chamber is configured with a gate valve, a part of the first channel close to the turbomolecular pump is configured with a high vacuum valve, a part of the second channel close to the cathode deposition chamber is configured with a roughing valve, a part of the second channel close to the foreline valve is configured with a pressure gauge, the third channel is configured with a foreline valve, wherein a first end of the third channel is connected to a middle section of the first channel between the gate valve and the high vacuum valve, a second end of the third channel is connected to a middle section of the second channel between the roughing valve and the mechanical pump; the second ultra-high vacuum pressure equipment comprises a turbomolecular pump, a mechanical pump, a fourth channel configured between the high vacuum valve and the anode deposition chamber, a fifth channel configured between the mechanical pump and the anode deposition chamber, a sixth channel configured between the fourth channel and the fifth channel, a part of the fourth channel close to the anode deposition chamber is configured with a gate valve, a part of the fourth channel close to the turbomolecular pump is configured with a high vacuum valve, a part of the fifth channel close to the anode deposition chamber is configured with a roughing valve, a part of the fifth channel close to the foreline valve is configured with a pressure gauge, and the sixth channel is configured with a foreline valve, wherein a first end of the sixth channel is connected to a middle section of the fourth channel between the gate valve and the high vacuum valve, a second end of the sixth channel is connected to a middle section of the fifth channel between the roughing valve and the mechanical pump; the third ultra-high vacuum pressure equipment comprises a turbomolecular pump, a mechanical pump, a seventh channel configured between the high vacuum valve and the solid-state electrolyte forming chamber, an eighth channel configured between the mechanical pump and the solid-state electrolyte forming chamber, a ninth channel configured between the seventh channel and the eighth channel, a part of the seventh channel close to the solid-state electrolyte forming chamber is configured with a gate valve, a part of the seventh channel close to the turbomolecular pump is configured with a high vacuum valve, a part of the eighth channel close to the solid-state electrolyte forming chamber is configured with a roughing valve, a part of the eighth channel close to the foreline valve is configured with a pressure gauge, and the ninth channel is configured with a foreline valve, wherein a first end of the ninth channel is connected to a middle section of the seventh channel between the gate valve and the high vacuum valve, a second end of the ninth channel is connected to a middle section of the eighth channel between the roughing valve and the mechanical pump; the fourth ultra-high vacuum pressure equipment comprises a turbomolecular pump, a mechanical pump, a tenth channel configured between the high vacuum valve and the stacking pressing chamber, an eleventh channel configured between the mechanical pump and the stacking pressing chamber, a twelfth channel configured between the tenth channel and the eleventh channel, a part of the tenth channel close to the stacking pressing chamber is configured with a gate valve, a part of the tenth channel close to the turbomolecular pump is configured with a high vacuum valve, a part of the eleventh channel close to the stacking pressing chamber is configured with a roughing valve, a part of the eleventh channel close to the foreline valve is configured with a pressure gauge, and the twelfth channel is configured with a foreline valve, wherein a first end of the twelfth channel is connected to a middle section of the tenth channel between the gate valve and the high vacuum valve, a second end of the twelfth channel is connected to a middle section of the eleventh channel between the roughing valve and the mechanical pump.

In one or more embodiments, the first gas input equipment comprises an isolation valve configured on the cathode deposition chamber and a mass flow rate controller connected to the isolation valve, a low pressure gauge connected to the mass flow rate controller, a gas filter connected to the low pressure gauge, a pressure regulator connected to the gas filter, a high pressure gauge connected to the pressure regulator and a gas cylinder connected to the high pressure gauge; the second gas input equipment comprises an isolation valve configured on the anode deposition chamber, a mass flow rate controller connected to the isolation valve, a low pressure gauge connected to the mass flow rate transducer, a gas filter connected to the low pressure gauge, a pressure regulator connected to the gas filter, a high pressure gauge connected to the pressure regulator and a gas cylinder connected to the high pressure gauge; the third gas input equipment comprises an isolation valve configured on the solid-state electrolyte forming chamber, a mass flow rate controller connected to the isolation valve, a low pressure gauge connected to the mass flow rate controller, a gas filter connected to the low pressure gauge, a pressure regulator connected to the gas filter, a high pressure gauge connected to the pressure regulator, and a gas cylinder connected to the high pressure gauge; the fourth gas input equipment comprises an isolation valve configured on the stacking pressing chamber, a mass flow rate controller connected to the isolation valve, a low pressure gauge connected to the mass flow rate controller, a gas filter connected to the low pressure gauge, a pressure regulator connected to the gas filter, a high pressure gauge connected to the pressure regulator, and a gas cylinder connected to the high pressure gauge.

In one or more embodiments, the solid-state electrolyte forming process device is a laser engraving device, the laser engraving device is based on a laser engraving image provided by a processor to generate a concave and convex micro-structure on the solid-state electrolyte of the solid-state battery workpiece semi-finished product.

In one or more embodiments, the transport device comprises a mechanical arm, a multi-axis mechanical arm, a linear load platform, a transport pneumatic cylinder, a transport hydraulic cylinder, a transport electromechanical transducing driving and control equipment, a multi-axis transport mechanism and/or a load shifting device.

The present invention also provides a solid-state battery electrolyte manufactured by the automatic solid-state battery production equipment, wherein the two sides of the solid-state battery electrolyte have a concave and convex microstructure, and the concave structures on the first side of the solid-state battery electrolyte are interleaved with the concave structures on the second side of the solid-state battery electrolyte.

In one or more embodiments, the distance between a first plane at the bottom of the concave structures on the first side and a second plane at the bottom of the concave structures on the second side passed through by the concave and convex micro-structure is less than or equal to 20 μm.

In one or more embodiments, the convex structure on the concave and convex micro-structure has a diameter of approximately 20 μm.

In one or more embodiments, the convex structures are arranged on the surface of the solid-state battery electrolyte at 30 μm×30 μm, 40 μm×40 μm or 60 μm×60 μm.

As mentioned above, the present invention can effectively improve the manufacture efficiency of solid-state batteries, so that the automatic mass production of solid-state batteries can be realized.

DESCRIPTION OF THE EMBODIMENTS

In order to make the technical connotation of the present invention more detailed and complete, the following descriptions are provided for implementations and specific embodiments of the present invention, but the following descriptions are not the only way to implement or use specific embodiments of the present invention. If the necessary technical contents of the present invention can be easily understood by a person with general knowledge in the art through the following descriptions, and the present invention can be changed and modified to adapt to different uses and conditions without violating the spirit and scope of the present invention, the implementation is also within the scope of the patent application of the present invention.

In addition, the features and components in the drawings are not drawn to actual scale and are drawn only in such a way as to best represent the specific features and components related to the present invention. In addition, the same or similar components and parts are referred to by the same or similar component symbols among different figures.

In this context, "a/an" and "the" may also be constructed as plurals unless the context otherwise indicates.

In this context, unless the context otherwise indicates, "include", "comprise", "have" and "contain" are inclusive or open-ended and do not exclude other elements or method steps that are not stated.

In this context, the terms "middle", "up", "down", "front", "back", "left", "right", "vertical", "horizontal", "top", "bottom", "inside", "outside" and so on used to indicate the description of azimuth or position relation are based on the azimuth or position relation shown in the drawings and are used solely for the purpose of facilitating the description of the present invention and simplifying the description, rather than indicating or implying that the device or component referred to must have a particular orientation, be constructed and operated in a particular orientation and therefore cannot be construed as a limitation to the present invention.

In this context, "setup", "installation", "connect", "connection", "fixed" and so on should be broadly understood, such as a fixed connection, a detachable connection, a mechanical connection, a direct connection, an indirect connection through an intermediate medium. The specific meaning of the above terms in the present invention can be understood by a person with general knowledge in the art according to the specific circumstances.

The present invention mainly provides an automatic solid-state battery production equipment, comprising: a cathode deposition device; an anode deposition device; a solid-state electrolyte forming device; a stacking pressing device; and one or more transport devices, used for moving parts manufactured by the cathode deposition device, the anode deposition device and the solid-state electrolyte forming device to the stacking pressing device to crimp into an automatic solid-state battery finished product through the stacking pressing device so as to realize an automatic processing procedure.

Figure 1:
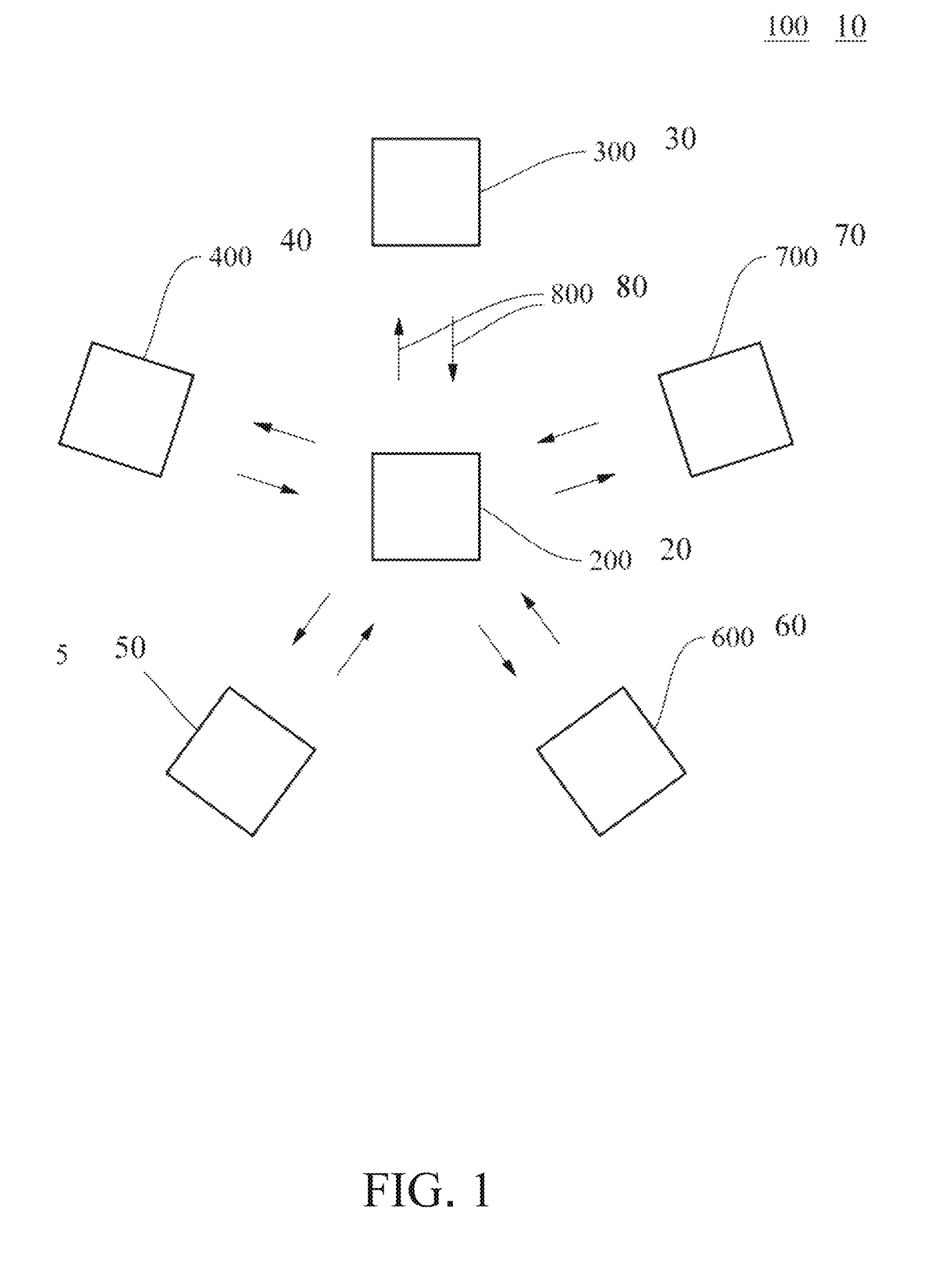
FIG. 1 is an overall schematic diagram of an automatic solid-state battery production equipment of the present invention.

Please refer to FIG. 1, FIG. 1 is an overall schematic diagram of an automatic solid-state battery production equipment of the present invention.

The automatic solid-state battery production equipment 10 of the present invention mainly comprises a transport device 20, a cathode deposition device 30, an anode deposition device 40, a solid-state electrolyte forming device 60, and a stacking pressing device 70. The transport device movement route 80 of the transport device 20 can be shuttled among the cathode deposition device 30, the anode deposition device 40, the solid-state electrolyte forming device 60 and the stacking pressing device 70.

In order to make the production process of solid-state batteries more efficient, an isolation device 50 can be further added to the automatic solid-state battery production equipment 10. Through the transport device 20, the solid-state battery workpiece semi-finished product completed by the cathode deposition device 30, the anode deposition device 40, the solid-state electrolyte forming device 60 is temporarily placed in the isolation device 50. In another embodiment, the isolation device 50 may also serve as a buffer for the process to assist or accelerate the production process by resting, cooling or cleaning procedures, etc., which is not limited in the present invention.

In addition, in order to improve producing efficiency, the number of the cathode deposition device 30, the anode deposition device 40, the isolation device 50, the solid-state electrolyte forming device 60 and the stacking pressing device 70 can be plural. The total number of such devices may be but not limited to 8, 9, 10, 11, 12, 20, 40, 60, 80, 100 or even more, depending on the capacity of solid-state battery to be produced and the demand of a production line, which is not limited in the present invention. The cluster arrangement disclosed in FIG. 1 can be used to transfer the finished and semi-finished products between different devices through an intermediate transport device 20, wherein in the cluster arrangement, the devices can be arranged into octagonal, nine-sided, ten-sided, eleven-sided or twelve-sided shapes according to the number of devices, so as to make the production of overall solid-state battery more efficient; in other embodiments, the arrangement of such devices is not limited to the cluster arrangement as shown in FIG. 1, and the whole production line may also be arranged in the form of an assembly line (e.g. a single-line assembly operation, a multi-line assembly operation, etc.) and separated into multiple devices with separate chambers by gas-tight valves, which are not limited in the present invention.

In one embodiment, the transport device 20 for example may comprise but not be limited to a mechanical arm, a multi-axis mechanical arm, a linear load platform, a transport pneumatic cylinder, a transport hydraulic cylinder, a transport electromechanical transducing driving and control equipment, a multi-axis transport mechanism and/or a load shifting device; and in some embodiments, the transport device may use the above multiple devices at the same time (for example, transporting semi-finished products through a transport track and shifting loads through the mechanical arms), which is not limited in the present invention.

The main structures, operation modes and process parameters of cathode deposition device 30, anode deposition device 40, solid-state electrolyte forming device 60 and stacking pressing device 70 of the automatic solid-state battery production equipment 10 are further described below.

Figure 2:
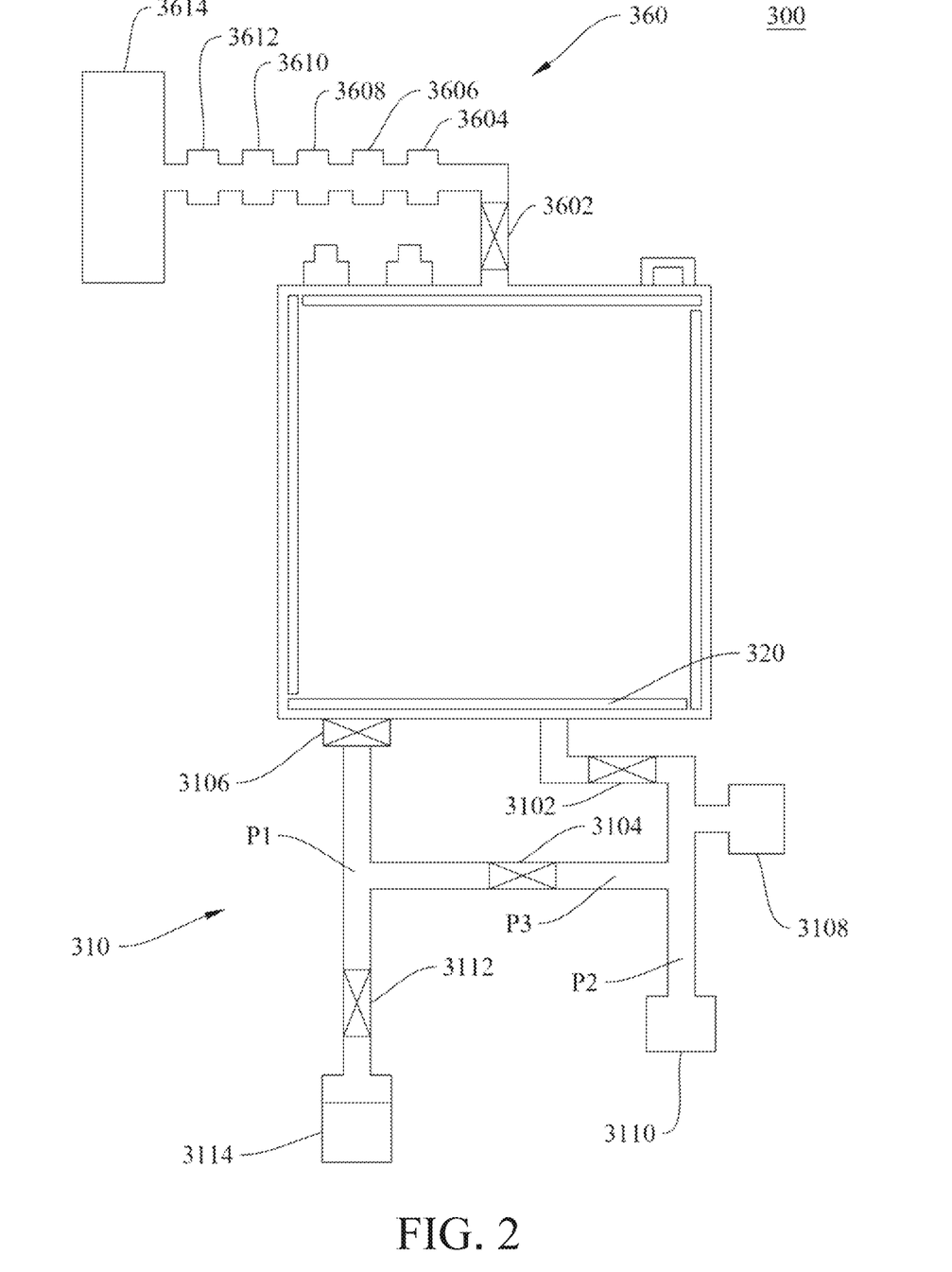
FIG. 2 is a schematic diagram of a cathode deposition device of the automatic solid-state battery production equipment of the present invention.

Please refer to FIG. 2, FIG. 2 is a schematic diagram of a cathode deposition device of the automatic solid-state battery production equipment of the present invention.

The cathode deposition device 30 mainly comprises a cathode deposition chamber 300, in which an cathode processing device (not shown in the icon), a gas input equipment 360, an ultra-high vacuum pressure equipment 310, a plurality of heater 320 and a plurality of transducers are mainly configured.

The cathode deposition device 30 is used for making a cathode of solid-state battery. In an embodiment, the environmental parameters of the cathode deposition chamber 300 are controlled between the temperature of 50 to 250° C., the humidity of 0, the vacuum degree of $2\times10^{-6}$ to $9\times10^{-6}$ torr, and the pressure of 1 to 1000 Kpa. In this environment, the manufacturing efficiency of the cathode of solid-state battery can be improved, so that a plurality of transducers can be configured in the cathode deposition chamber 300 to monitor and control the process parameters.

The transducers comprise a temperature controller, a humidity controller, a gas flow rate controller, a vacuum gauge and a pressure gauge. For example, the temperature controller can be but not limited to a thermocouple gauge. For example, the humidity controller can be but not limited to a quartz crystal oscillation humidity controller, a polymer humidity controller, an electrolyte humidity controller, a ceramic humidity controller, a semiconductor humidity controller, a thick film humidity controller or a condensation humidity controller. For example, the gas flow rate controller can be but not limited to a mass flow rate controller (MFC). The vacuum gauge and the pressure gauge can be but not limited to a capacitance diaphragm gauge, a piezo gauge, a CMOS-MEMS pirani gauge or an ion gauge.

With respect to the ambient temperature of the cathode deposition chamber 300, the temperature may range from 50 to 250° C., specifically for example the range between any two of the following values, e.g. 50° C., 75° C., 100° C., 125° C., 150° C., 175° C., 200° C. or 250° C., preferably from 150 to 200° C. in the present invention.

The ambient vacuum degree of the cathode deposition chamber 300, the vacuum degree may range from $2 \times 10^{-6}$ to $9 \times 10^{-6}$ torr, specifically for example the range between any two of the following values, e.g. $2 \times 10^{-6}$ Torr, $3 \times 10^{-6}$ torr, $4 \times 10^{-6}$ torr, $5 \times 10^{-6}$ torr, $6 \times 10^{-6}$ torr, $7 \times 10^{-6}$ torr, $8 \times 10^{-6}$ torr or $9 \times 10^{-6}$ torr, preferably from $2 \times 10^{-6}$ to $5 \times 10^{-6}$ torr in the present invention.

With respect to the ambient pressure of the cathode deposition chamber 300, the pressure may range from 1 to 1000 Kpa, specifically for example: 1 to 250 Kpa, 1 to 500 Kpa, 1 to 750 Kpa, 1 to 1000 Kpa, 5 to 250 Kpa, 5 to 500 Kpa, 5 to 750 Kpa or 5 to 1000 Kpa, preferably from 5 to 500 Kpa in the present invention.

The cathode processing device may be adjusted appropriately according to a processing mode of the cathode of the solid-state battery used by a user. In the present invention, if the producing mode of the cathode of the solid-state battery is 3D printing, the cathode processing device is a 3D printer. Specific examples include but not limited to an extrusion 3D printer, a metal wire 3D printer, a granular 3D printer, a laminated 3D printer, etc. If the producing mode of the cathode of the solid-state battery is taken as physical vapor deposition (PVD), especially thermal evaporation deposition, the cathode processing device is a thermal evaporation processing equipment of physical vapor deposition. When the producing mode of the cathode of the solid-state battery is taken as chemical vapor deposition (CVD), the cathode processing device is a CVD processing equipment.

The gas input equipment 360 comprises an isolation valve 3602 configured on the cathode deposition chamber 300, a mass flow rate controller 3604 connected to the isolation valve 3602, a low pressure gauge 3606 connected to the mass flow rate controller 3604, a gas filter 3608 connected to a low pressure gauge 3606, the pressure regulator 3610 connected to the gas filter 3608, a high pressure gauge 3612 connected to the pressure regulator 3610 and a gas cylinder 3614 connected to the high pressure gauge 3612.

The ultra-high vacuum pressure equipment 310 comprises a turbomolecular pump 3114, a mechanical pump 3110, a first channel P1 configured between a high vacuum valve 3112 and the cathode deposition chamber 300, a second channel P2 configured between the mechanical pump 3110 and the cathode deposition chamber 300, and a third channel P3 configured between the first channel P1 and the second channel P2. A part of the first channel P1 close to the cathode deposition chamber 300 is configured with a gate valve 3106, and a part of the first channel P1 close to the turbomolecular pump 3114 is configured with a high vacuum valve 3112. A part of the second channel P2 close to the cathode deposition chamber 300 is configured with a roughing valve 3102, and a part of the second channel P2 close to the foreline valve 3104 is configured with a pressure gauge 3108, and the third channel P3 is configured with a foreline valve 3104. A first end of the third channel P3 is connected to a middle section of the first channel P1 between the gate valve 3106 and the high vacuum valve 3112, and a second end of the third channel P3 is connected to a middle section of the second channel P2 between the roughing valve 3102 and the mechanical pump 3110.

The heater 320 for example can be but not limited to an IR heater or a far infrared heater etc.

To produce the cathode of the solid-state battery, opening the roughing valve 3102, the foreline valve 3104 and the gate valve 3106, and closing the high vacuum valve 3112, and then using the mechanical pump 3110 to reduce the air pressure of the cathode deposition chamber 300 to $10^{-3}$ torr (measured by the pressure gauge 3108); after the pressure in the chamber 300 drops to $10^{-3}$ torr, closing the roughing valve 3102 and the foreline valve 3104, and continuing to open the gate valve 3106; and then opening the high vacuum valve 3112, and using the turbomolecular pump 3114 to reduce the pressure in the chamber 300 to $10^{-6}$ torr, preferably to $2 \times 10^{-6}$ torr; opening the gas cylinder 3614 and the isolation valve 3602, and using the mass flow rate controller 3604 to control the gas flow rate to be from 20 SCCM (when the cathode deposition chamber 300 is a small chamber) to 50 SLM (when the cathode deposition chamber 300 is a large chamber); and finally baking the semi-finished anode of the solid-state battery in the heater 320 at 50° C. to 250° C. to obtain the finished cathode of the solid-state battery.

The gas in the gas cylinder 3614 may be but not limited to argon, krypton, argon mixed with 1-20% oxygen or krypton mixed with 1-20% oxygen.

The cathode of the solid-state battery can be made from but is not limited to unary, binary or ternary materials. The ternary materials are such as LiCoNiMnOX, LiNiCoMn Oxide (NCM oxide), lithium iron phosphate (LiFePO4), sulfide, wherein the chemical quantified ratio of nickel, cobalt and manganese in the NCM can be 0.8:0.1:0.1, but not limited to this.

Figure 3:
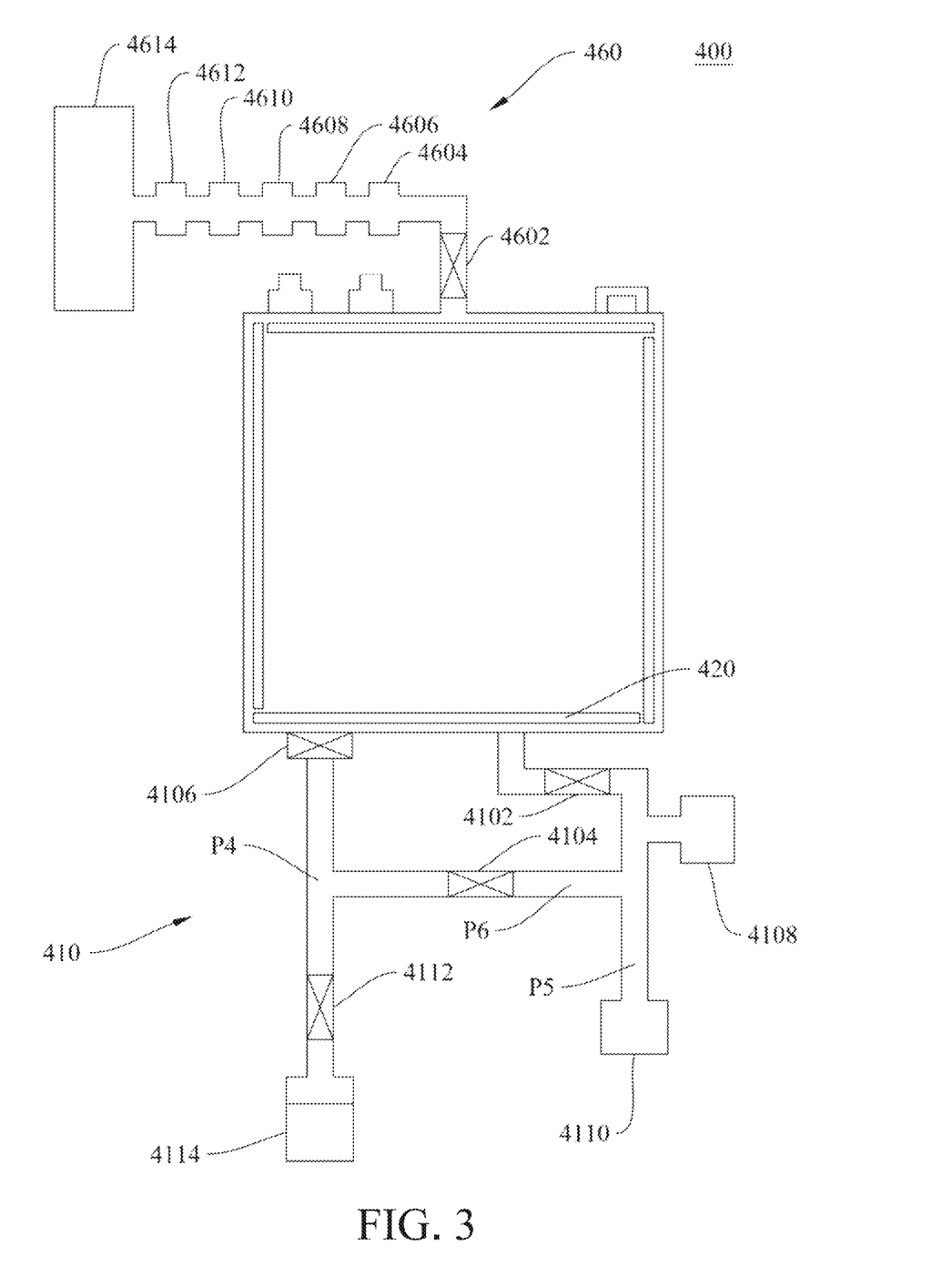
FIG. 3 is a schematic diagram of an anode deposition device of the automatic solid-state battery production equipment of the present invention.

Please refer to FIG. 3, FIG. 3 is a schematic diagram of a anode deposition device of the automatic solid-state battery production equipment of the present invention.

The anode deposition device 40 mainly comprises an anode deposition chamber 400, in which a anode processing device (not shown in the icon), a gas input equipment 460, an ultra-high vacuum pressure equipment 410, a plurality of heater 420 and a plurality of transducers are mainly configured.

The anode deposition device 40 is used for making a anode of solid-state battery. In an embodiment, the environmental parameters of the anode deposition chamber 400 are controlled between the temperature of 50 to 250° C., the humidity of 0, the vacuum degree of $2 \times 10^{-6}$ to $9 \times 10^{-6}$ torr, and the pressure of 1 to 1000 Kpa. In this environment, the manufacturing efficiency of the anode of solid-state battery can be improved, so that a plurality of transducers can be set in the anode deposition chamber 400 to monitor and control the process parameters.

The transducers comprise a temperature controller, a humidity controller, a gas flow rate controller, a vacuum gauge and a pressure gauge. For example, the temperature controller can be but not limited to a thermocouple gauge. For example, the humidity controller can be but not limited to a quartz crystal oscillation humidity controller, a polymer humidity controller, an electrolyte humidity controller, a ceramic humidity controller, a semiconductor humidity controller, a thick film humidity controller or a condensation humidity controller. For example, the gas flow rate controller can be but not limited to a mass flow rate controller (MFC). The vacuum gauge and the pressure gauge can be but not limited to a capacitance diaphragm gauge, a piezo gauge, a CMOS-MEMS pirani gauge or an ion gauge.

With respect to the ambient temperature of the anode deposition chamber 400, the temperature may range from 50 to 250° C., specifically for example the range between any two of the following values, e.g. 50° C., 75° C., 100° C., 125° C., 150° C., 175° C., 200° C. or 250° C., preferably from 125 to 175° C. in the present invention.

With respect to the ambient vacuum degree of the anode deposition chamber 400, the vacuum degree may range from $2\times10^{-6}$ to $9\times10^{-6}$ torr, specifically for example the range between any two of the following values, e.g. $2\times10^{-6}$ Torr, $3\times10^{-6}$ torr, $4\times10^{-6}$ torr, $5\times10^{-6}$ torr, $6\times10^{-6}$ torr, $7\times10^{-6}$ torr, $8\times10^{-6}$ torr or $9\times10^{-6}$ torr, preferably from $2\times10^{-6}$ to $5\times10^{-6}$ torr in the present invention.

With respect to the ambient pressure of the anode deposition chamber 400, the pressure may range from 1 to 1000 Kpa, specifically for example: 1 to 250 Kpa, 1 to 500 Kpa, 1 to 750 Kpa, 1 to 1000 Kpa, 5 to 250 Kpa, 5 to 500 Kpa, 5 to 750 Kpa or 5 to 1000 Kpa, preferably from 5 to 500 Kpa in the present invention.

The anode processing device may be adjusted appropriately according to a processing mode of the anode of the solid-state battery used by a user. In the present invention, if the producing mode of the anode of the solid-state battery is 3D printing, the anode processing device is a 3D printer. Specific examples include but not limited to an extrusion 3D printer, a metal wire 3D printer, a granular 3D printer, a laminated 3D printer, etc. If the producing mode of the anode of the solid-state battery is taken as physical vapor deposition (PVD), especially thermal evaporation deposition, the anode processing device is a hot evaporation processing equipment of physical vapor deposition. When the producing mode of the anode of the solid-state battery is taken as chemical vapor deposition (CVD), the anode processing device is a CVD processing equipment.

The gas input equipment 460 comprises an isolation valve 4602 configured on the anode deposition chamber 400, a mass flow rate controller 4604 connected to the isolation valve 4602, a low pressure gauge 4606 connected to the mass flow rate controller 4604, a gas filter 4608 connected to a low pressure gauge 4606, and a gas filter 4608 connected to the low pressure gauge 4606, the pressure regulator 4610 connected to the gas filter 4608, a high pressure gauge 4612 connected to the pressure regulator 4610 and a gas cylinder 4614 connected to the high pressure gauge 4612.

The ultra-high vacuum pressure equipment 410 comprises a turbomolecular pump 4114, a mechanical pump 4110, a fourth channel P4 configured between a high vacuum valve 4112 and the anode deposition chamber 400, a fifth channel P5 configured between the mechanical pump 4110 and the anode deposition chamber 400, and a sixth channel P6 configured between the fourth channel P4 and the fifth channel P5. A part of the fourth channel P4 close to the anode deposition chamber 400 is configured with a gate valve 4106, and a part of the fourth channel P4 close to the turbomolecular pump 4114 is configured with a high vacuum valve 4112. A part of the fifth channel P5 close to the anode deposition chamber 400 is configured with a roughing valve 4102, and a part of the fifth channel 135 close to the foreline valve 4104 is configured with a pressure gauge 4108, and the sixth channel P6 is configured with a foreline valve 4104. A first end of the sixth channel P6 is connected to a middle section of the fourth channel P4 between the gate valve 4106 and the high vacuum valve 4112, and a second end of the sixth channel P6 is connected to a middle section of the fifth channel 135 between the roughing valve 4102 and the mechanical pump 4110.

The heater 420 for example can be but not limited to an IR heater or a far infrared heater etc.

To produce the anode of the solid-state battery, opening the roughing valve 4102, the foreline valve 4104 and the gate valve 4106, and closing the high vacuum valve 4112, and then using the mechanical pump 4110 to reduce the air pressure of the anode deposition chamber 400 to $10^{-3}$ torr (measured by the pressure gauge 4108); after the pressure in the chamber 400 drops to $10^{-3}$ torr, closing the roughing valve 4102 and the foreline valve 4104, and continuing to open the gate valve 4106; and then opening the high vacuum valve 4112, and using the turbomolecular pump 4114 to reduce the pressure in the chamber 400 to $10^{-6}$ torr, preferably to $2\times10^{-6}$ torr; opening the gas cylinder 4614 and the isolation valve 4602, and using the mass flow rate controller 4604 to control the gas flow rate to be from 20SCCM (when the anode deposition chamber 400 is a small chamber) to 50 SLM (when the anode deposition chamber 400 is a large chamber); and finally baking the semi-finished anode of the solid-state battery in the heater 420 at 50° C. to 250° C. to obtain the finished anode of the solid-state battery.

The gas in the gas cylinder 4614 may be but not limited to argon or krypton.

Material for producing the anode of the solid-state battery may be for example but not limited to graphite, graphite coated on copper foil, graphite coated on silicon, lithium, or graphite and lithium coated on copper foil.

Figure 4:
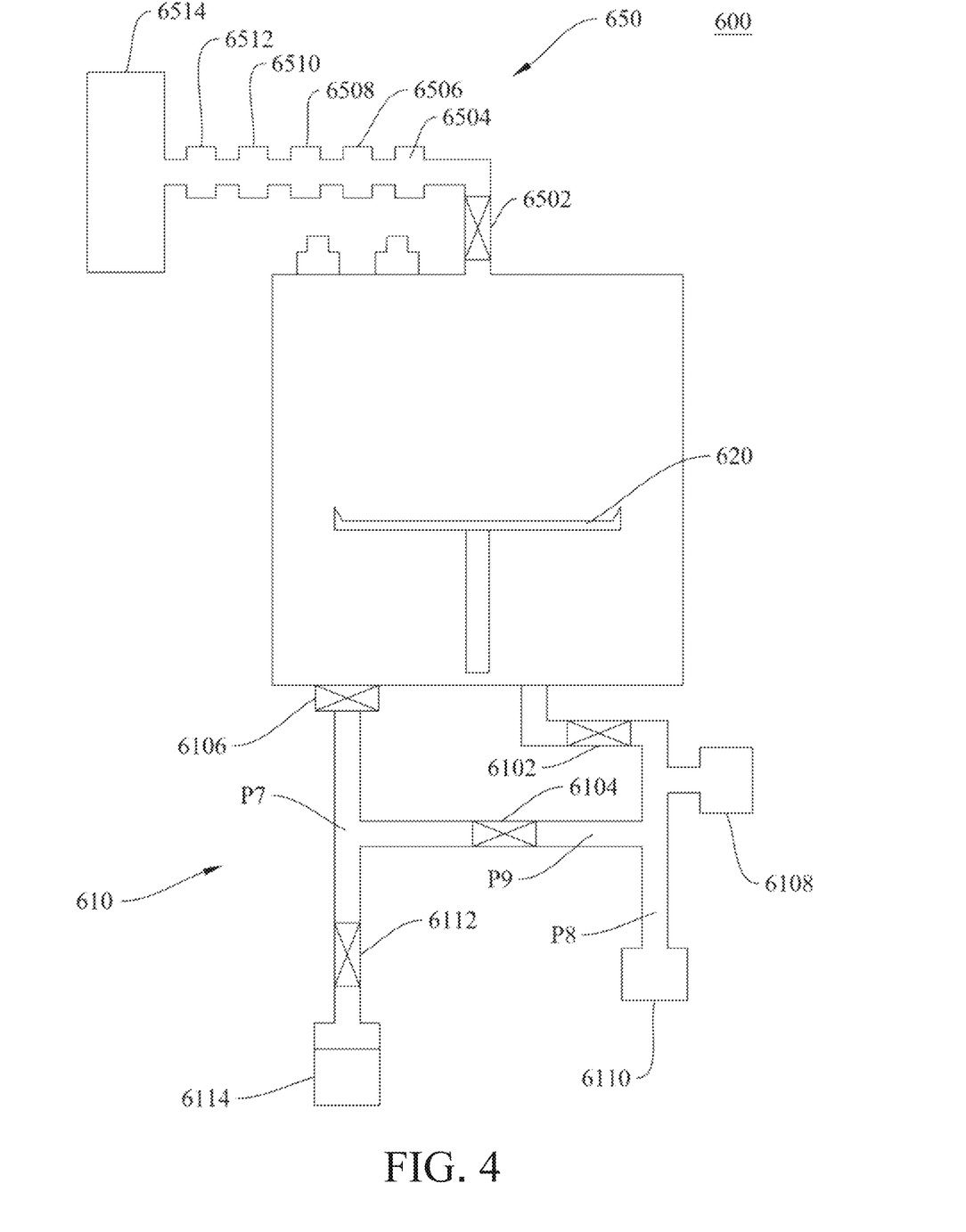
FIG. 4 is a schematic diagram of a solid-state electrolyte forming device of the automatic solid-state battery production equipment of the present invention.

Please refer to FIG. 4, FIG. 4 is a schematic diagram of a solid-state electrolyte forming device of the automatic solid-state battery production equipment of the present invention.

The solid-state electrolyte forming device 60 mainly comprises a solid-state electrolyte forming chamber 600, in which a solid-state electrolyte forming processing device (not shown in the icon), a gas input equipment 650, an ultra-high vacuum pressure equipment 610, a plurality of transducers and a carrier device 620 are mainly configured.

The solid-state electrolyte forming device 60 is used for making solid-state electrolyte of solid-state battery. In an embodiment, the environmental parameters of the solid-state electrolyte forming chamber 600 are controlled between the temperature of 22 to 100° C., the humidity of 0, the vacuum degree of $2\times10^{-6}$ to $9\times10^{-6}$ torr, and the pressure of 1 to 1000 Kpa. In this environment, the manufacturing efficiency of solid-state electrolyte can be improved, so that a plurality of transducers can be set in the solid-state electrolyte forming chamber 600 to monitor and control the process parameters.

The transducers comprise a temperature controller, a humidity controller, a gas flow rate controller, a vacuum gauge and a pressure gauge. For example, the temperature controller can be but not limited to a thermocouple gauge. For example, the humidity controller can be but not limited to a quartz crystal oscillation humidity controller, a polymer humidity controller, an electrolyte humidity controller, a ceramic humidity controller, a semiconductor humidity controller, a thick film humidity controller or a condensation humidity controller. For example, the gas flow rate controller can be but not limited to a mass flow rate controller (MFC). The vacuum gauge and the pressure gauge can be but not limited to a capacitance diaphragm gauge, a piezo gauge, a CMOS-MEMS pirani gauge or an ion gauge.

With respect to the ambient temperature of the solid-state electrolyte forming chamber 600, the temperature may be between 22 and 100° C., specifically for example between 22 and 50° C., 22 and 75° C., 22 and 100° C., 25 and 50° C., 25 and 75° C. or 25 and 100° C., preferably 25 and 75° C. in the present invention.

With respect to the ambient vacuum degree of the solid-state electrolyte forming chamber 600, the vacuum degree may range from $2\times10^{-6}$ to $9\times10^{-6}$ torr, specifically for example the range between any two of the following values, e.g. $2×10^{-6}$ Torr, $3×10^{-6}$ torr, $4×10^{-6}$ torr, $5×10^{-6}$ torr, $6×10^{-6}$ torr, $7×10^{-6}$ torr, $8×10^{-6}$ torr or $9×10^{-6}$ torr, preferably from $2×10^{-6}$ to $5×10^{-6}$ torr in the present invention.

With respect to the ambient pressure of the solid-state electrolyte forming chamber 600, the pressure may range from 1 to 1000 Kpa, specifically for example: 1 to 250 Kpa, 1 to 500 Kpa, 1 to 750 Kpa, 1 to 1000 Kpa, 5 to 250 Kpa, 5 to 500 Kpa, 5 to 750 Kpa or 5 to 1000 Kpa, preferably from 5 to 500 Kpa in the present invention.

The solid-state electrolyte forming chamber 600 is made of stainless steel.

The gas input equipment 650 comprises an isolation valve 6502 configured on the solid-state electrolyte forming chamber 600, a mass flow rate controller 6504 connected to the isolation valve 6502, a low pressure gauge 6506 connected to the mass flow rate controller 6504, a gas filter 6508 connected to a low pressure gauge 6506, the pressure regulator 6510 connected to the gas filter 6508, a high pressure gauge 6512 connected to the pressure regulator 6510 and a gas cylinder 6514 connected to the high pressure gauge 6512.

The ultra-high vacuum pressure equipment 610 comprises a turbomolecular pump 6114, a mechanical pump 6110, a seventh channel P7 configured between a high vacuum valve 6112 and the solid-state electrolyte forming chamber 600, an eighth channel P8 configured between the mechanical pump 6110 and the solid-state electrolyte forming chamber 600, and a ninth channel P9 configured between the seventh channel P7 and the eighth channel P8. A part of the seventh channel P7 close to the solid-state electrolyte forming chamber 600 is configured with a gate valve 6106, and a part of the seventh channel P7 close to the turbomolecular pump 6114 is configured with a high vacuum valve 6112. A part of the eighth channel P8 close to the solid-state electrolyte forming chamber 600 is configured with a roughing valve 6102, and a part of the eighth channel P8 close to the foreline valve 6104 is configured with a pressure gauge 6108, and the ninth channel P9 is configured with a foreline valve 6104. A first end of the ninth channel P9 is connected to a middle section of the seventh channel P7 between the gate valve 6106 and the high vacuum valve, and a second end of the ninth channel P9 is connected to a middle section of the eighth channel P8 between the roughing valve 6102 and the mechanical pump 6110.

Figure 6:
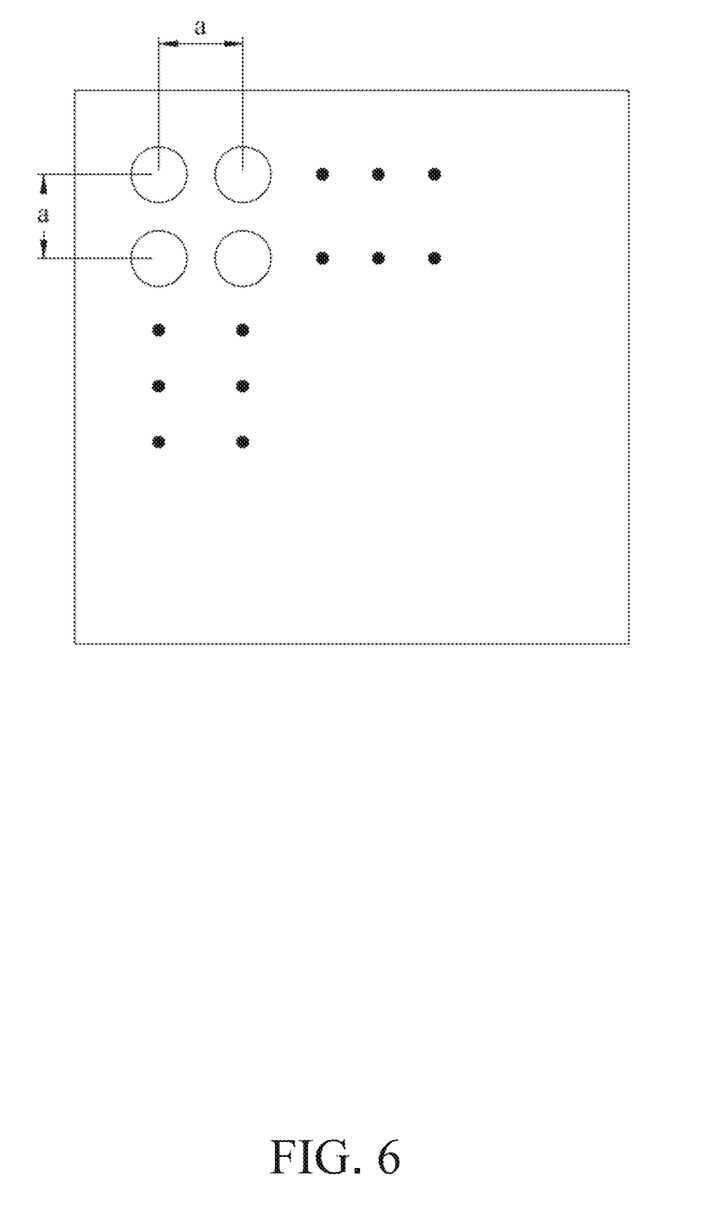
FIG. 6 is a schematic diagram of a solid-state battery electrolyte produced by the automatic solid-state battery manufacturing equipment of the present invention with convex structures arranged on the surface of the solid-state battery electrolyte.

In an embodiment, the solid-state electrolyte of the solid-state battery is designed by laser to have concave and convex micro-structures on both sides, and the concave structures on the first side and the concave structures on the second side of the solid-state battery electrolyte are interlaced, which could effectively improve the cathode and anode ion exchange in the solid-state battery and greatly increase the power supply of the solid-state battery.

Wherein, the distance between a first plane at the bottom of the concave structures on the first side and a second plane at the bottom of the concave structures on the second side passed through by the concave and convex micro-structure of solid-state electrolyte is less than or equal to 20 μm, for example, less than or equal to 20 μm, less than or equal to 15 μm, less than or equal to 10 μm, or less than or equal to 5 μm.

The convex structures on the convex micro-structure of the solid-state electrolyte is about 20 μm in diameter. In this context, the term "roughly" means within ±5% of the indicated number, so the diameter of the convex structure is 25 μm, 24 μm, 23 μm, 22 μm, 21 μm, 20 μm, 19 μm, 18 μm, 17 μm, 16 μm or 15 μm.

Further, refer to FIG. 6, the distance between two adjacent convex structures of the solid-state electrolyte is a, and the distance a can specifically be 30 μm, 40 μm, or 60 μm. Therefore, the convex structures can be arranged on the surface of the solid-state battery electrolyte in a manner of 30 μm×30 μm, 40 μm×40 μm, or 60 μm×60 μm.

To produce the solid-state electrolyte of solid-state battery, opening the roughing valve 6102, the foreline valve 6104 and the gate valve 6106, and closing the high vacuum valve 6112, and then using the mechanical pump 6110 to reduce the air pressure of the solid-state electrolyte forming chamber 600 to $10^{-3}$ torr; after the pressure in the chamber 600 drops to $10^{-3}$ torr, closing the roughing valve 6102 and the foreline valve 6104, and continuing to open the gate valve 6106; and then opening the high vacuum valve 6112, and using the turbomolecular pump 6114 to reduce the pressure in the chamber 600 to $10^{-6}$ torr, preferably to $2×10^{-6}$ torr; opening the gas cylinder 6514 filled with nitrogen, opening the isolation valve 6502, and using the mass flow rate controller 6504 to control the gas flow rate of nitrogen to be from 20 SCCM (when the solid-state electrolyte forming chamber 600 is a small chamber) to 50 SLM (when the solid-state electrolyte forming chamber 600 is a large chamber) to obtain the finished solid-state electrolyte.

The carrier device 620 can carry the semi-finished solid-state electrolyte of the solid-state battery and rotate freely during the manufacturing process of the semi-finished product so that the gas can be uniformly attached to the semi-finished product in the process.

The material for producing the solid-state electrolyte may be but not limited to garnet electrolyte lithium lanthanum zirconium oxide (LLZO) (e.g. being but not limited to Li7La3Zr2O12, Li2ZrO3, Li4Ti5O12, LiAlO2, LiNbO3) or sulfide electrolytes (e.g. being but not limited to Li2S, Li3PS4, LiPSClBr, LiGePS), or other similar material.

Figure 5:
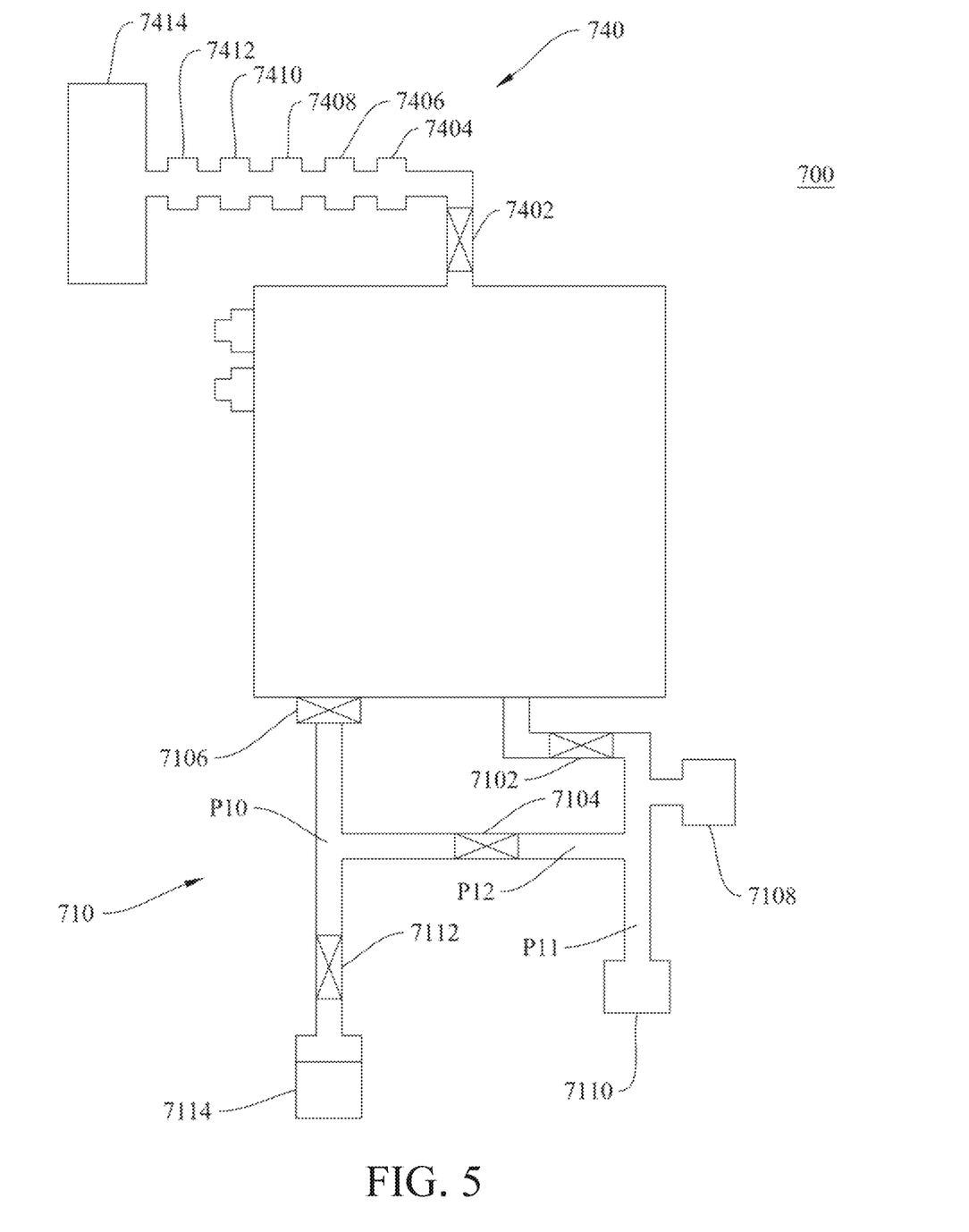
FIG. 5 is a schematic diagram of a stacking pressing device for the automatic solid-state battery production equipment of the present invention.

Please refer to FIG. 5, FIG. 5 is a schematic diagram of a stacking pressing device for the automatic solid-state battery production equipment of the present invention.

The stacking pressing device 70 mainly comprises a stacking pressing chamber 700, in which a stacking pressing device (not shown in the icon), a gas input equipment 740, an ultra-high vacuum pressure equipment 710 and a plurality of transducers are mainly configured.

The stacking pressing device 70 is used to stack crimp the aforementioned cathode made by the cathode deposition device, the anode made by the anode deposition device, and the solid-state electrolyte made by the solid-state electrolyte forming device. In an embodiment, when the environmental parameters of the stacking pressing chamber 700 are controlled between the temperature of 22 to 100° C., the vacuum degree of $2×10^{-6}$ to $9×10^{-6}$ torr, and the pressure of 300 to 600 Kpa, the stacking pressing efficiency can be improved, so that a plurality of transducers can be set in the stacking pressing chamber 700 to monitor and control the process parameters.

The transducers comprise a temperature controller, a humidity controller, a gas flow rate controller, a vacuum gauge and a pressure gauge. For example, the temperature controller can be but not limited to a thermocouple gauge. For example, the humidity controller can be but not limited to a quartz crystal oscillation humidity controller, a polymer humidity controller, an electrolyte humidity controller, a ceramic humidity controller, a semiconductor humidity controller, a thick film humidity controller or a condensation humidity controller. For example, the gas flow rate controller can be but not limited to a mass flow rate controller (MFC). The vacuum gauge and the pressure gauge can be but not limited to a capacitance diaphragm gauge, a piezo gauge, a CMOS-MEMS pirani gauge or an ion gauge.

With respect to the ambient temperature of the stacking pressing chamber 700, the temperature may range from 22 to 100° C., specifically for example the range from 22 to 50° C., 22 to 75° C., 22 to 100° C., 25 to 50° C., 25 to 75° C. or 25 to 100° C., preferably 25 to 50° C. in the present invention.

With respect to the ambient vacuum degree of the stacking pressing chamber 700, the vacuum degree may range from $2\times10^{-6}$ to $9\times10^{-6}$ torr, specifically for example the range between any two of the following values, e.g. $2\times10^{-6}$ torr, $3\times10^{-6}$ torr, $4\times10^{-6}$ torr, $5\times10^{-6}$ torr, $6\times10^{-6}$ torr, $7\times10^{-6}$ torr, $8\times10^{-6}$ torr or $9\times10^{-6}$ torr, preferably from $2\times10^{-6}$ to $5\times10^{-6}$ torr in the present invention.

The stacking pressing device 70 is crimped by a Load Cell and measured by a strain gauge. The pressure provided by the stacking pressing device can range from 300 to 600 Kpa, specifically for example the range between any two of the following values: 300 Kpa, 350 Kpa, 400 Kpa, 450 Kpa, 500 Kpa, 550 Kpa or 600 Kpa, preferably from 350 to 500 Kpa in the present invention.

The stacking pressing chamber 700 is made of stainless steel.

The stacking pressing processing device may be adjusted appropriately according to a processing mode of the solid-state electrolyte of the solid-state battery. In an embodiment, the stacking pressing processing device may be, for example, a hydraulic equipment, an oil pressure equipment, a mechanical stamping equipment, or any other equipment capable of providing flat pressure, which is not limited in the present invention.

The gas input equipment 740 comprises an isolation valve 7402 configured on the stacking pressing chamber 700, a mass flow rate controller 7404 connected to the isolation valve 7402, a low pressure gauge 7406 connected to the mass flow rate controller 7404, a gas filter 7408 connected to a low pressure gauge 7406, the pressure regulator 7410 connected to the gas filter 7408, a high pressure gauge 7412 connected to the pressure regulator 7410 and a gas cylinder 7414 connected to the high pressure gauge 7412.

The ultra-high vacuum pressure equipment 710 comprises a turbomolecular pump 7114, a mechanical pump 7110, a tenth channel P10 configured between a high vacuum valve 7112 and the stacking pressing chamber 700, an eleventh channel P11 configured between the mechanical pump 7110 and the stacking pressing chamber 700, and a twelfth channel P12 configured between the tenth channel P10 and the eleventh channel P11. A part of the tenth channel P10 close to the stacking pressing chamber 700 is configured with a gate valve 7106, and a part of the tenth channel P10 close to the turbomolecular pump 7114 is configured with a high vacuum valve 7112. A part of the eleventh channel P11 close to the stacking pressing chamber 700 is configured with a roughing valve 7102, and a part of the eleventh channel P11 close to the foreline valve 7104 is configured with a pressure gauge 7108, and the twelfth channel P12 is configured with a foreline valve 7104. A first end of the twelfth channel P12 is connected to a middle section of the tenth channel P10 between the gate valve 7106 and the high vacuum valve, and a second end of the twelfth channel P12 is connected to a middle section of the eleventh channel P11 between the roughing valve 7102 and the mechanical pump 7110.

To perform the stacking pressing of solid-state battery, opening the roughing valve 7102, the foreline valve 7104 and the gate valve 7106, and closing the high vacuum valve 7112, and then using the mechanical pump 7110 to reduce the air pressure of the stacking pressing chamber 700 to $10^{-3}$ torr; after the pressure in the chamber 700 drops to $10^{-3}$ torr, closing the roughing valve 7102 and the foreline valve 7104, and continuing to open the gate valve 7106; and then opening the high vacuum valve 7112, and using the turbomolecular pump 7114 to reduce the pressure in the chamber 700 to $10^{-6}$ torr, preferably to $2\times10^{-6}$ torr; opening the gas cylinder 7514 filled with argon, opening the isolation valve 7502, and using the mass flow rate controller 7504 to control the gas flow rate of argon to be from 20 SCCM (when the stacking pressing chamber 700 is a small chamber) to 50 SLM (when the stacking pressing chamber 700 is a large chamber) to obtain the finished solid-state battery.

The present invention has been described in detail above, but the above is only prefer implementations and embodiments of the present invention, and is not intended to limit the scope of the present invention, that is, any person with general knowledge in the art can change and modify the present invention to adapt to different uses and conditions without violating its spirit and scope, so the implementation also belongs to the scope of patent application of the present invention.

The invention claimed is:

1. An automatic solid-state battery production equipment, comprising:
   a cathode deposition device, wherein the cathode deposition device comprises a cathode deposition chamber and a cathode processing device configured in the cathode deposition chamber, a first gas input equipment, a first ultra-high vacuum pressure equipment, a plurality of first heater and a plurality of first transducers;
   an anode deposition device, the anode deposition device comprises an anode deposition chamber and an anode processing device configured in the anode deposition chamber, a second gas input equipment, a second ultra-high vacuum pressure equipment, a plurality of second heater and a plurality of second transducers;
   a solid-state electrolyte forming device, the solid-state electrolyte forming device comprises a solid-state electrolyte forming chamber, a solid-state electrolyte forming processing device configured in the solid-state electrolyte forming chamber, a third gas input equipment, a third ultra-high vacuum pressure equipment, a plurality of third transducers and a carrier device;
   a stacking pressing device, wherein the stacking pressing device comprises a stacking pressing chamber and a stacking pressing processing device configured in the stacking pressing chamber, a fourth gas input equipment, a fourth ultra-high vacuum pressure equipment, and a plurality of fourth transducers; and
   one or more transport devices, used for moving parts manufactured by the cathode deposition device, the anode deposition device and the solid-state electrolyte forming device to the stacking pressing device to crimp into a finished solid-state battery through the stacking pressing device so as to realize an automatic processing procedure.

2. The automatic solid-state battery production equipment as claimed in claim 1, further comprises an isolation device comprising an isolation chamber and a plurality of transducers configured in the isolation chamber.

3. The automatic solid-state battery production equipment as claimed in claim 1, wherein the first transducer, the second transducer, the third transducer and the fourth transducer comprise a temperature controller, a humidity controller, a gas flow rate controller, a vacuum gauge and a pressure gauge.

4. The automatic solid-state battery production equipment as claimed in claim 1, wherein the first ultra-high vacuum pressure equipment comprises a first turbomolecular pump, a first mechanical pump, and a first high vacuum valve configured between the cathode deposition chamber and the first turbomolecular pump, a first channel configured between the first high vacuum valve and the cathode deposition chamber, a second channel configured between the first mechanical pump and the cathode deposition chamber, a third channel configured between the first channel and the second channel, a part of the first channel close to the cathode deposition chamber is configured with a first gate valve, a part of the second channel close to the cathode deposition chamber is configured with a first roughing valve, the third channel is configured with a first foreline valve, a part of the second channel close to the first foreline valve is configured with a first pressure gauge, wherein a first end of the third channel is connected to a middle section of the first channel between the first gate valve and the first high vacuum valve, a second end of the third channel is connected to a middle section of the second channel between the first roughing valve and the first mechanical pump; the second ultra-high vacuum pressure equipment comprises a second turbomolecular pump, a second mechanical pump, a second high vacuum valve configured between the anode deposition chamber and the second turbomolecular pump, a fourth channel configured between the second high vacuum valve and the anode deposition chamber, a fifth channel configured between the second mechanical pump and the anode deposition chamber, a sixth channel configured between the fourth channel and the fifth channel, a part of the fourth channel close to the anode deposition chamber is configured with a second gate valve, a part of the fifth channel close to the anode deposition chamber is configured with a second roughing valve, and the sixth channel is configured with a second foreline valve, a part of the fifth channel close to the second foreline valve is configured with a second pressure gauge, wherein a first end of the sixth channel is connected to a middle section of the fourth channel between the second gate valve and the second high vacuum valve, a second end of the sixth channel is connected to a middle section of the fifth channel between the second roughing valve and the second mechanical pump; the third ultra-high vacuum pressure equipment comprises a third turbomolecular pump, a third mechanical pump, a third high vacuum valve configured between the solid-state electrolyte forming chamber and the third turbomolecular pump, a seventh channel between the third high vacuum valve and the solid-state electrolyte forming chamber, an eighth channel between the third mechanical pump and the solid-state electrolyte forming chamber, a ninth channel between the seventh channel and the eighth channel, a part of the seventh channel close to the solid-state electrolyte forming chamber is configured with a third gate valve, a part of the eighth channel close to the solid-state electrolyte forming chamber is configured with a third roughing valve and the ninth channel is configured with a third foreline valve, a part of the eighth channel near the third front valve is configured with a third pressure gauge, wherein a first end of the ninth channel is connected to a middle section of the seventh channel between the third gate valve and the third high vacuum valve, a second end of the ninth channel is connected to a middle section of the eighth channel between the third roughing valve and the third mechanical pump; the fourth ultra-high vacuum pressure equipment comprises a fourth turbomolecular pump, a fourth mechanical pump, and a fourth high vacuum valve configured between the stacking pressing chamber and the fourth turbomolecular pump, a tenth channel configured between the fourth high vacuum valve and the stacking pressing chamber, an eleventh channel configured between the fourth mechanical pump and the stacking pressing chamber, a twelfth channel configured between the tenth channel and the eleventh channel, a part of the tenth channel close to the stacking pressing chamber is configured with a fourth gate valve, a part of the eleventh channel close to the stacking pressing chamber is configured with a fourth roughing valve, and the twelfth channel is configured with a fourth foreline valve, a part of the eleventh channel close to the fourth front valve is configured with a fourth pressure gauge, wherein a first end of the twelfth channel is connected to a middle section of the tenth channel between the fourth gate valve and the fourth high vacuum valve, a second end of the twelfth channel is connected to a middle section of the eleventh channel between the fourth roughing valve and the fourth mechanical pump.

5. The automatic solid-state battery production equipment as claimed in claim 1, wherein the first gas input equipment comprises a first isolation valve configured on the cathode deposition chamber and a first mass flow rate controller connected to the first isolation valve, a first low pressure gauge connected to the first mass flow rate controller, a first gas filter connected to the first low pressure gauge, a first pressure regulator connected to the first gas filter, a first high pressure gauge connected to the first pressure regulator and a first gas cylinder connected to the first high pressure gauge; the second gas input equipment comprises a second isolation valve configured on the anode deposition chamber, a second mass flow rate controller connected to the second isolation valve, a second low pressure gauge connected to the second mass flow rate transducer, a second gas filter connected to the second low pressure gauge, a second pressure regulator connected to the second gas filter, a second high pressure gauge connected to the second pressure regulator and a second gas cylinder connected to the second high pressure gauge; the third gas input equipment comprises a third isolation valve configured on the solid-state electrolyte forming chamber, a third mass flow rate controller connected to the third isolation valve, a third low pressure gauge connected to the third mass flow rate controller, a third gas filter connected to the third low pressure gauge, a third pressure regulator connected to the third gas filter, a third pressure gauge connected to the third pressure regulator, and a third gas cylinder connected to the third high pressure gauge; the fourth gas input equipment comprises a fourth isolation valve configured on the stacking pressing chamber, a fourth mass flow rate controller connected to the fourth isolation valve, a fourth low pressure gauge connected to the fourth mass flow rate controller, a fourth gas filter connected to the fourth low pressure gauge, a fourth pressure regulator connected to the fourth gas filter, a fourth high pressure gauge connected to the fourth pressure regulator, and a fourth gas cylinder connected to the fourth high pressure gauge.

6. The automatic solid-state battery production equipment as claimed in claim 1, wherein the solid-state electrolyte forming processing device is a laser engraving device, the laser engraving device is based on a laser engraving image configured by a processor to generate a concave and convex micro-structure on the solid-state electrolyte of the solid-state battery workpiece semi-finished product.

7. The automatic solid-state battery production equipment as claimed in claim 1, wherein the transport device comprises a mechanical arm, a multi-axis mechanical arm, a linear load platform, a transport pneumatic cylinder, a transport hydraulic cylinder, a transport electromechanical transducing driving and control equipment, a multi-axis transport mechanism and/or a load shifting device.

\* \* \* \* \*